United States Patent [19]
Akatsuka et al.

[11] Patent Number: 5,315,572
[45] Date of Patent: May 24, 1994

[54] INFORMATION REPRODUCING APPARATUS CAPABLE OF ELIMINATING JITTERS

[75] Inventors: Yuichiro Akatsuka, Tama; Yoshio Nakajima, Higashimurayama, both of Japan

[73] Assignee: Olympus Optical Co., Ltd., Tokyo, Japan

[21] Appl. No.: 11,114

[22] Filed: Jan. 29, 1993

Related U.S. Application Data

[63] Continuation of Ser. No. 644,615, Jan. 23, 1991, abandoned.

[51] Int. Cl.⁵ .................................................. G11B 7/00
[52] U.S. Cl. ............................................ 369/54; 369/43; 369/124
[58] Field of Search ............... 369/43, 47, 48, 59, 369/32, 44.11, 44.37, 54, 124, 126; 360/36.1, 37.1; 358/310, 327, 339

[56] References Cited

U.S. PATENT DOCUMENTS

| | | | |
|---|---|---|---|
| 4,603,412 | 7/1986 | Yamazaki | 369/43 |
| 4,646,278 | 2/1987 | Okano | 369/44.28 |
| 4,730,293 | 3/1988 | Pierce et al. | 369/44.37 |
| 4,878,131 | 10/1989 | Sakata et al. | 360/37.1 |
| 4,888,753 | 12/1989 | Enari et al. | 369/47 |
| 5,042,019 | 8/1991 | Kitai et al. | 369/32 |
| 5,083,301 | 1/1992 | Matuba et al. | 369/32 |
| 5,089,999 | 2/1992 | Ishida et al. | 369/32 |

FOREIGN PATENT DOCUMENTS

| | | | |
|---|---|---|---|
| 0301537 | 2/1989 | European Pat. Off. | 369/44.11 |
| 1-138633 | 5/1989 | Japan. | |
| 2-141932 | 5/1990 | Japan. | |

*Primary Examiner*—W. R. Young
*Assistant Examiner*—Nabil Hindi
*Attorney, Agent, or Firm*—Frishauf, Holtz, Goodman & Woodward

[57] ABSTRACT

A read head makes a relative movement with respect to a recording medium to simultaneously read data from at least two of a plurality of recording areas of the recording medium in which the data is recorded. A memory section stores data from at least one of the two recording areas read by the read head. A relative position detecting section detects a relative position between the recording medium and the read head. A controlling section controls a storing operation of the data from the one of the two recording areas into the memory section, on the basis of an output of the relative position detecting section. A readout section reads out the data stored in the memory section in synchronization with a clock of a specified period. A modulation section demodulates the data read out by the readout section, after the modulation of the data read from another of the two recording areas.

12 Claims, 5 Drawing Sheets

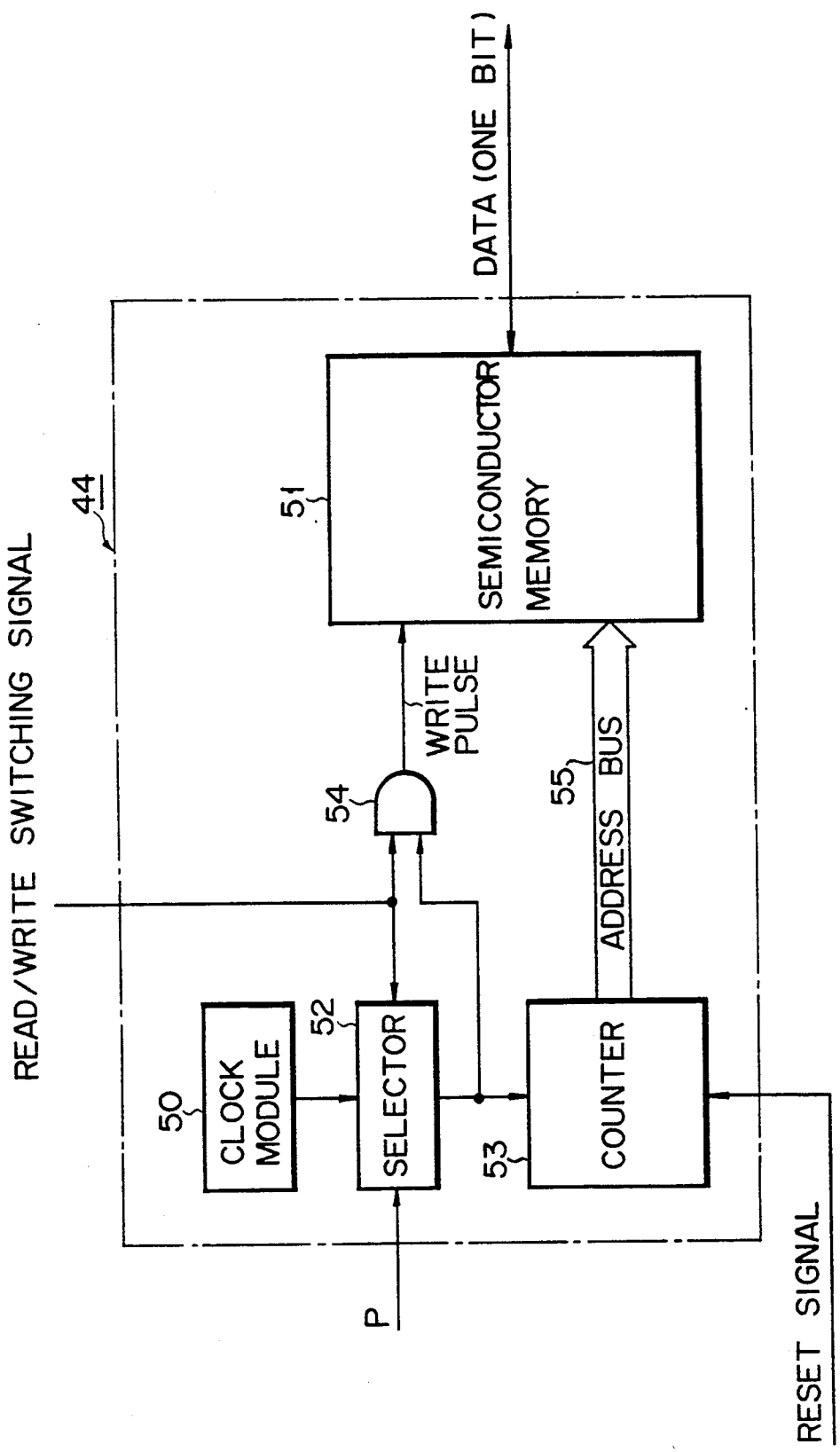
F I G. 2

INFORMATION REPRODUCING APPARATUS CAPABLE OF ELIMINATING JITTERS

This application is a continuation of application Ser. No. 07/644,615, filed Jan. 23, 1991 now abandoned.

BACKGROUND OF THE INVENTION

1. Field of the Invention

This invention relates to an information reproducing apparatus, and more particularly to an information reproducing apparatus that reads information recorded on to a recording medium such as an optical card.

2. Description of the Related Art

In information reproducing apparatus using optical cards, since the reading speed is determined by the relative speed between the optical head for reading information and the recording medium, the optical scan (hereinafter referred to as scan) of a single track upon which rays of the reading light are directed for readout cannot make the readout speed for data much faster.

To improve this, an apparatus such as disclosed in U.S. Pat. No. 4,730,293, for example, scans more than one track simultaneously and makes a parallel reading of information on the multiple tracks to make the readout speed faster.

The assignee of this application has proposed an apparatus, as is disclosed in Published Unexamined Japanese Patent Application No. 2-141932, which scans a plurality of recording areas of the recording medium simultaneously to demodulate the data read from one recording area (track), and at the same time, to store in the memory the data read from the other recording area (track) and, after the demodulation of the former data is completed, demodulates the stored data. This arrangement allows the demodulation by a single system.

FIG. 4 shows a block diagram of the information reproducing apparatus disclosed in the above mentioned Japanese Patent Application No. 2-141932. In FIG. 4, two tracks n and n+1 of the recording medium are scanned simultaneously, and the reflected light rays are detected by photodetectors 11 and 21, respectively. An output of the photodetector 11 is amplified by an amplifier 12, and then is converted into a binary signal by a binarizing circuit 13. The binary signal passes through a selector 14 and a PLL (Phase-Locked Loop) circuit composed of a phase detector 14 and a VFO (Variable Frequency Oscillator) 17 and then enters a demodulator 18 where it is demodulated. The output of the photodetector 21 is amplified by an amplifier 22, converted into a binary signal by a binarizing circuit 23, and stored in a memory section 24. After the demodulation of the data of the track n is complete, the stored signal is passed through the selector 14 and the PLL circuit 15 and supplied to the demodulator 18.

FIG. 5 is a block diagram of the memory section 24 of FIG. 4. The memory section 24 is made up of a clock module 25, a semiconductor memory 26, a counter 27, and an AND gate 28. When data is stored, the read/write switching signal is first set to the write mode, causing the AND gate 28 to be opened, while the reset signal is supplied to the counter 27, resetting its contents. All these actions are controlled by the controller (not shown). Then, the counter 27 counts up in response to the clock from the clock module 25. The output of the counter 27 is supplied as an address, via the address bus 29, to the semiconductor memory 26, whereas the clock signal from the clock module 25 is supplied to the AND gate 28, which supplies the write pulse to the semiconductor memory 26 in synchronization with the address setting, causing the data to be stored in the specified address. The reading of stored data from the semiconductor memory 26 is accomplished by, after the completion of demodulation of the track n's data, switching the selector 14 in response to the select signal from the controller (refer to FIG. 4) so that the data from the memory section 24 is supplied to the PLL circuit 15, and at the same time, changing the read/write switching signal to the read mode and supplying the reset signal to the counter 27 for an increment of address.

However, in the information reproducing apparatus of FIG. 4 where the clock from the clock module 25 is used as the write pulse for the semiconductor memory 26, if the data contains jitters, it will be stored together with the jitters in the semiconductor memory 26. This makes it impossible to reproduce the data accurately, particularly in the case of demodulating the data recorded in the self-clocked modulation method. Such jitters occur due to, for example, irregular motor rotation, known as cogging, caused by uneven magnetic force within the rotary motor that is used as a drive for the recording medium.

SUMMARY OF THE INVENTION

It is, therefore, an object of the present invention to provide a new and improved information reproducing apparatus capable of eliminating jitters from data, which assures an accurate reproduction of recorded data by removing from the data the jitter component effectively in reading the data stored in the memory.

To accomplish the forgoing object, according to the present invention, there is provided an information reproducing apparatus that causes a recording medium and a read head to make a relative movement to simultaneously read data from at least two of a plurality of recording areas of the recording medium in which the data is recorded, comprising:

memory means for storing data from at least one of the two recording areas read by the read head;

relative position detecting means for detecting a relative position between the recording medium and the read head;

means for controlling a storing operation of the data, based on an output of the relative position detecting means, into the memory means; and means for reading-out the data stored in the memory means sequentially in synchronism with a clock of a specified period, to thereby demodulate the data read by the reading-out means.

Control of the writing of the data read by the read head into the memory means based on the relative position between the recording medium and the read head enables the writing of jitter-free data into the memory means. In addition, the reading of the stored data in synchronization with the clock of a specified period for demodulation produces jitter-free data. These features assure an accurate reproduction of recording data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given and the detailed description of the preferred embodiments given below, serve to explain the principles of the invention.

FIG. 2 is a block diagram showing a construction of the memory section of FIG. 1;

DETAILED DESCRIPTION OF THE PREFERRED EMBODIMENTS

Figure 1:
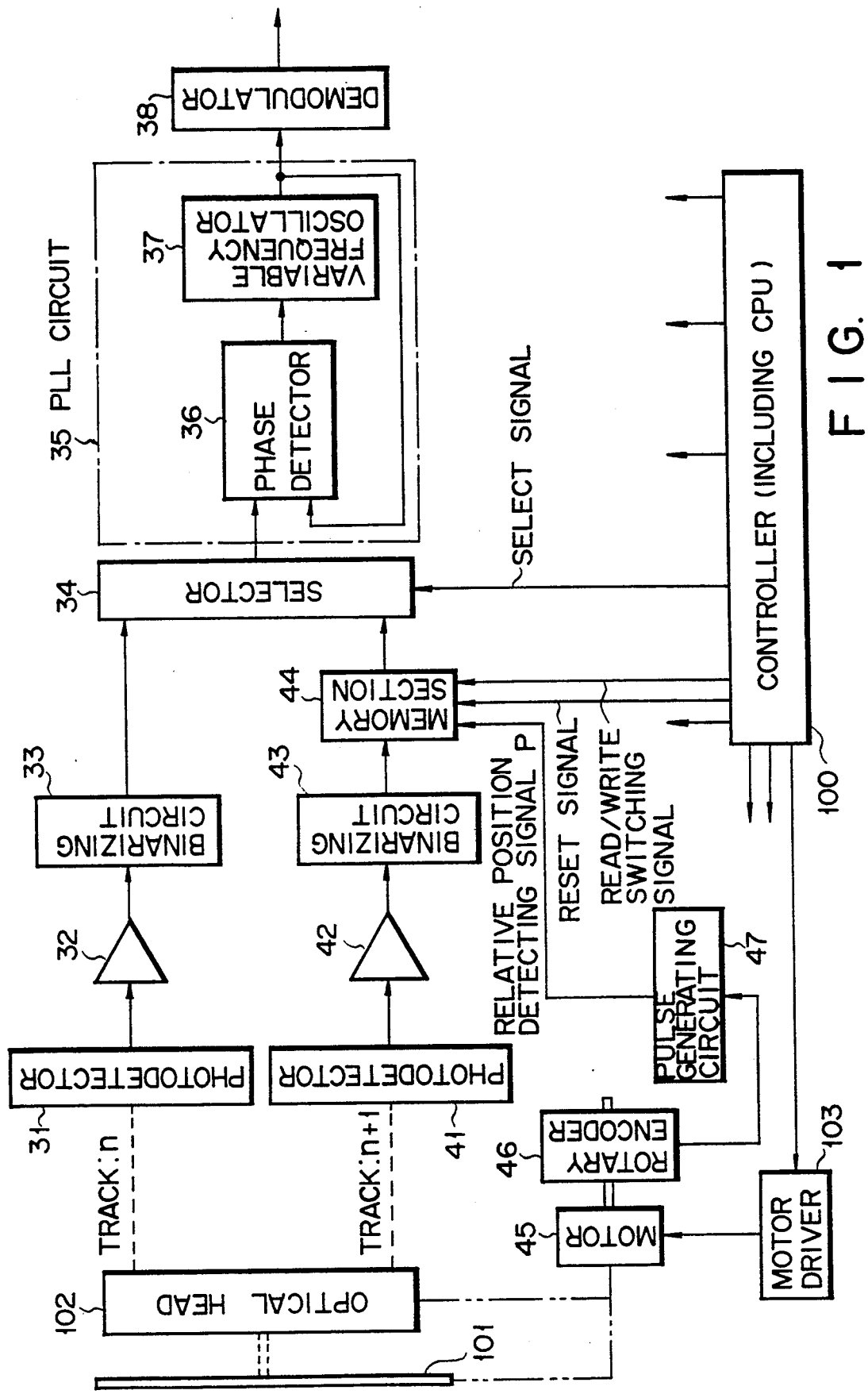
FIG. 1 is a block diagram for an embodiment of an information reproducing apparatus of the present invention.

Reference will now be made in detail to the presently preferred embodiments of the invention as illustrated in the accompanying drawings, in which like reference characters designate like or corresponding parts throughout the several drawings.

Figure 4:
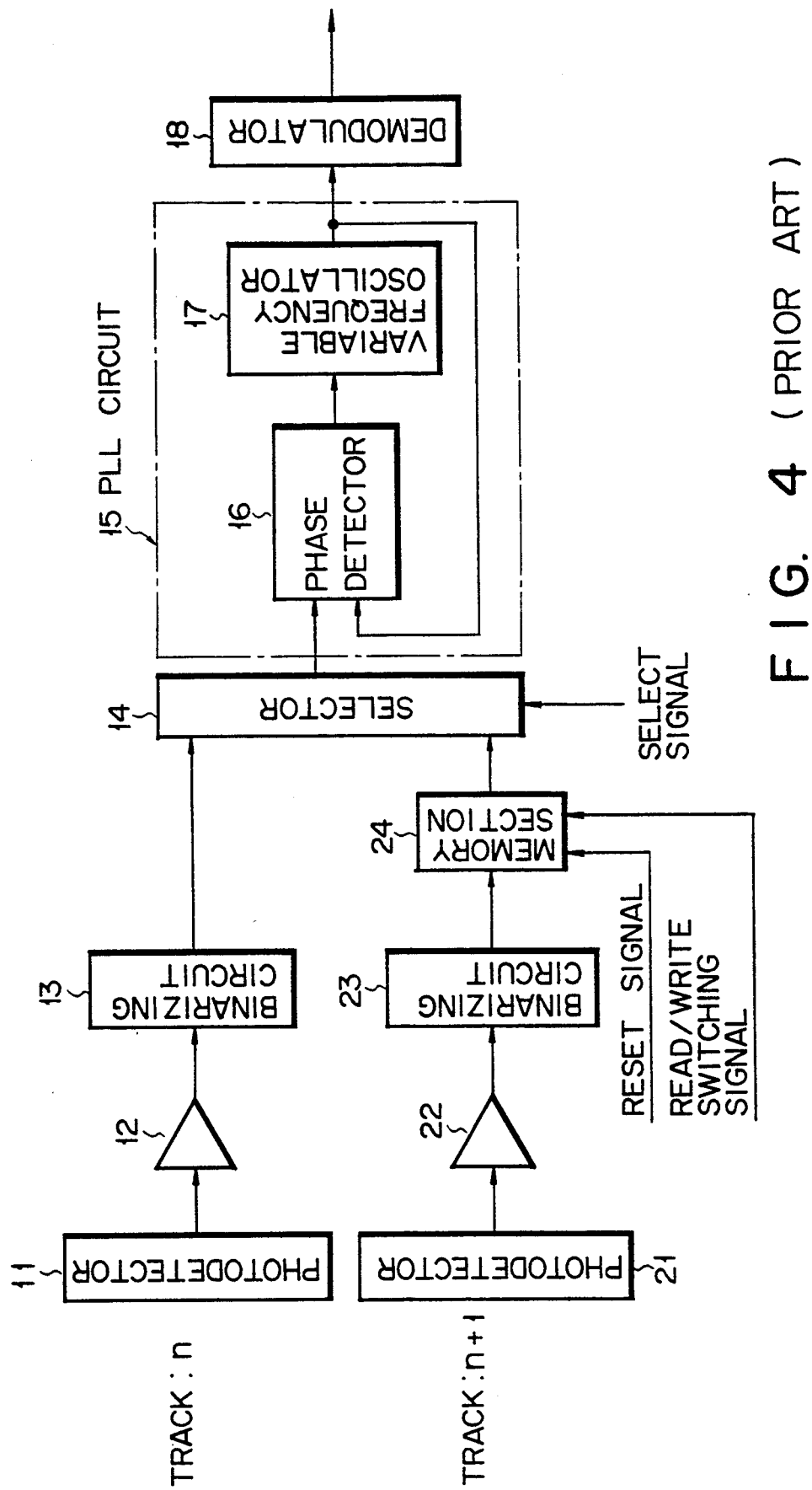
FIG. 4 is a block diagram of a conventional information reproducing apparatus.
Figure 5:
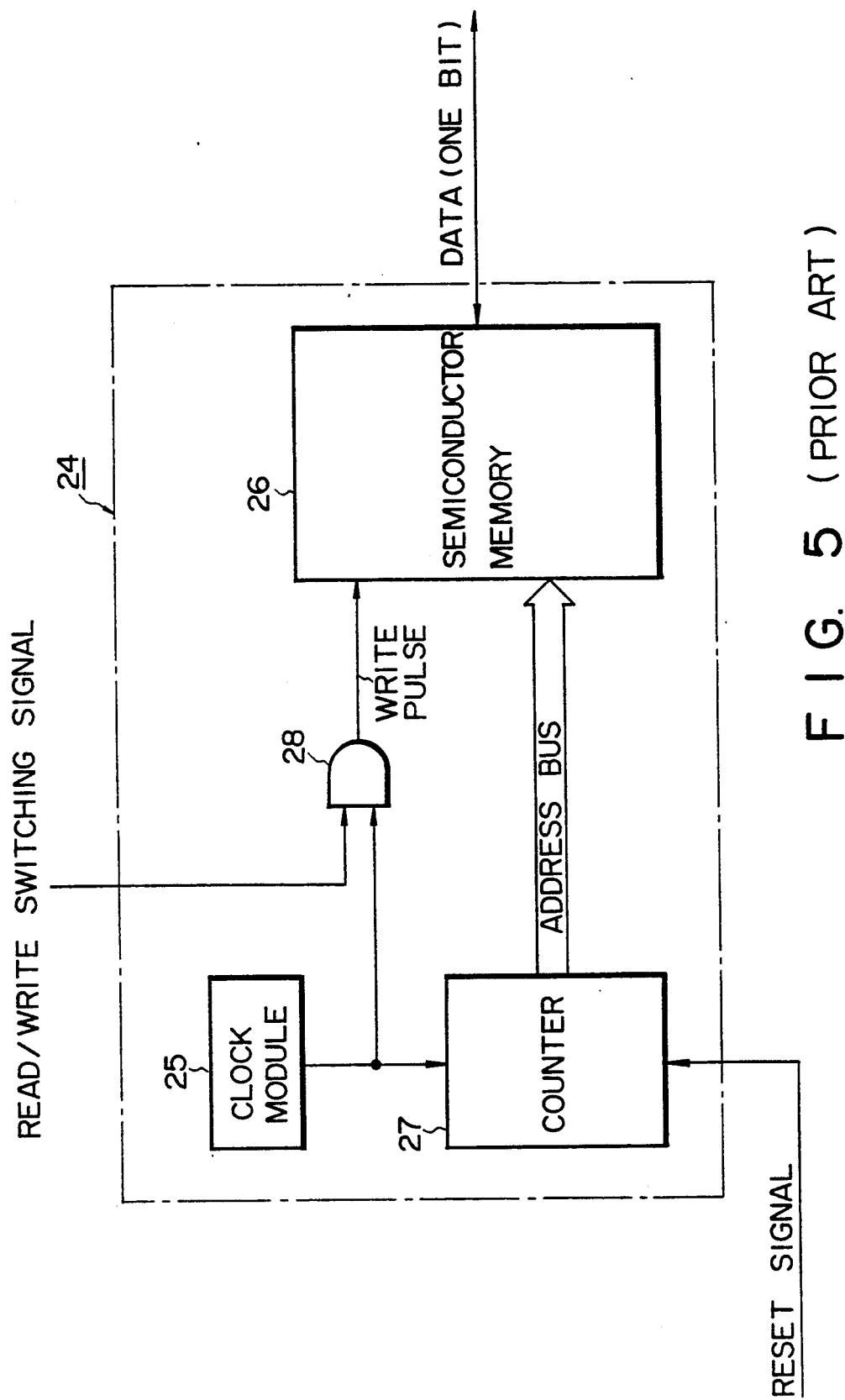
FIG. 5 is a block diagram illustrating a configuration of memory section in FIG. 4.

FIG. 1 shows an embodiment of the present invention. In this embodiment, like the information reproducing apparatus of FIG. 4, two tracks (n and n+1) of a recording medium 101 are scanned simultaneously and the reflected light rays are detected by photodetectors 31 and 41 to reproduce the data from the tracks n and n+1. An output of the photodetector 31 is amplified by an amplifier 32 and then is converted into a binary signal by a binarizing circuit 33. The binary signal passes through a selector 34 and a PLL circuit 35 composed of a phase detector 36 and a VFO 37 and then enters a demodulator 38 for demodulation. An output of the photodetector 41 is amplified by a amplifier 42, converted into a binary signal by a binarizing circuit 43, and stored in a memory section 44. After the demodulation of the data of the track n, the stored signal is supplied, via the selector 34 and the PLL circuit 35, to the demodulator 38 where it is demodulated.

In the embodiment, to read the data recorded on the tracks of the recording medium 101, a motor 45 that provides a relative movement, in the direction of track, between the recording medium 101 and an optical head 102 is connected to a rotary encoder 46. The rotary encoder 46 produces an output signal containing the frequency information on the relative position between the recording medium 101 and the optical head 102. Based on the output signal from the rotary encoder 46, a pulse generating circuit 47 generates a relative position detecting signal P and supplies it to the memory section 44. The signal P is used to create an address and pulse signal required to write data into the memory section 44.

The motor 45 is driven via a motor driving circuit 103 by a controller 100, which is designed to supply the necessary control signal and other signals to each section. The photodetectors 31 and 41 may be housed in the optical head 102 in practical use.

FIG. 2 illustrates a configuration of the memory section 44 of FIG. 1. The memory section 44 is made up of a clock module 50 that generates a clock signal of a specified period, a semiconductor memory 51 that stores the binary coded signal from the binary coding circuit 43, a selector that selects either the output of the clock module 50 or the relative position detecting signal P from the pulse generating circuit 47 on the basis of the read/write switching signal from the controller 100, a counter 53 that is reset by the reset signal from the controller 100 and sets an address for the write/read into and from the semiconductor memory 51 based on the signal selected by the selector 52, and an AND gate 54 that supplies the write pulse to the semiconductor memory 51 on the basis of the read/write switching signal and the signal selected by the selector 52.

The operation of this embodiment will be explained hereinafter.

When data is stored in the memory section 44, the read/write switching signal is first set to the write mode, causing the AND gate 54 to be opened, while the relative position detecting signal P is selected at the selector 52 and the reset signal is supplied to the counter 53 to reset its contents. These actions are controlled by the controller 100 containing a CPU. Then, the counter 53 counts up in response to the relative position detecting signal P. The output of the counter is supplied via the address bus 55 to the semiconductor memory 51, while the relative position detecting signal P is supplied to the AND gate 54, which allows the AND gate 54 to supply a write pulse to the semiconductor memory 51 in synchronism with the address setting, thereby storing data into the specified address. Thus, writing data into the semiconductor memory 51 based on the relative position detecting signal P eliminates jitters due to fluctuations in the relative speed from the data stored in the semiconductor memory 51.

When the stored data in the semiconductor memory 51 is read out, after the completion of demodulation of track n's data, the selector 34 is switched by the select signal from the controller 100 so that the data from the memory section 44 may be supplied to the PLL circuit 35, whereas the read/write switching signal is set to the read mode to select the output of the clock module 50 at the selector 52 and at the same time, the reset signal is applied to the counter 53 to make an increment of address. The clock from the clock module 50 is used to cause the counter 53 to produce an address for the semiconductor memory 51. With the address thus obtained, the stored data is read and demodulated. Therefore, reading data from the semiconductor memory 51 based on the clock of a specified period from the clock module 50 makes the reproduced data free from jitters.

The removal of jitters mentioned above will be described in more detail, referring to FIG. 3.

Figure 3:
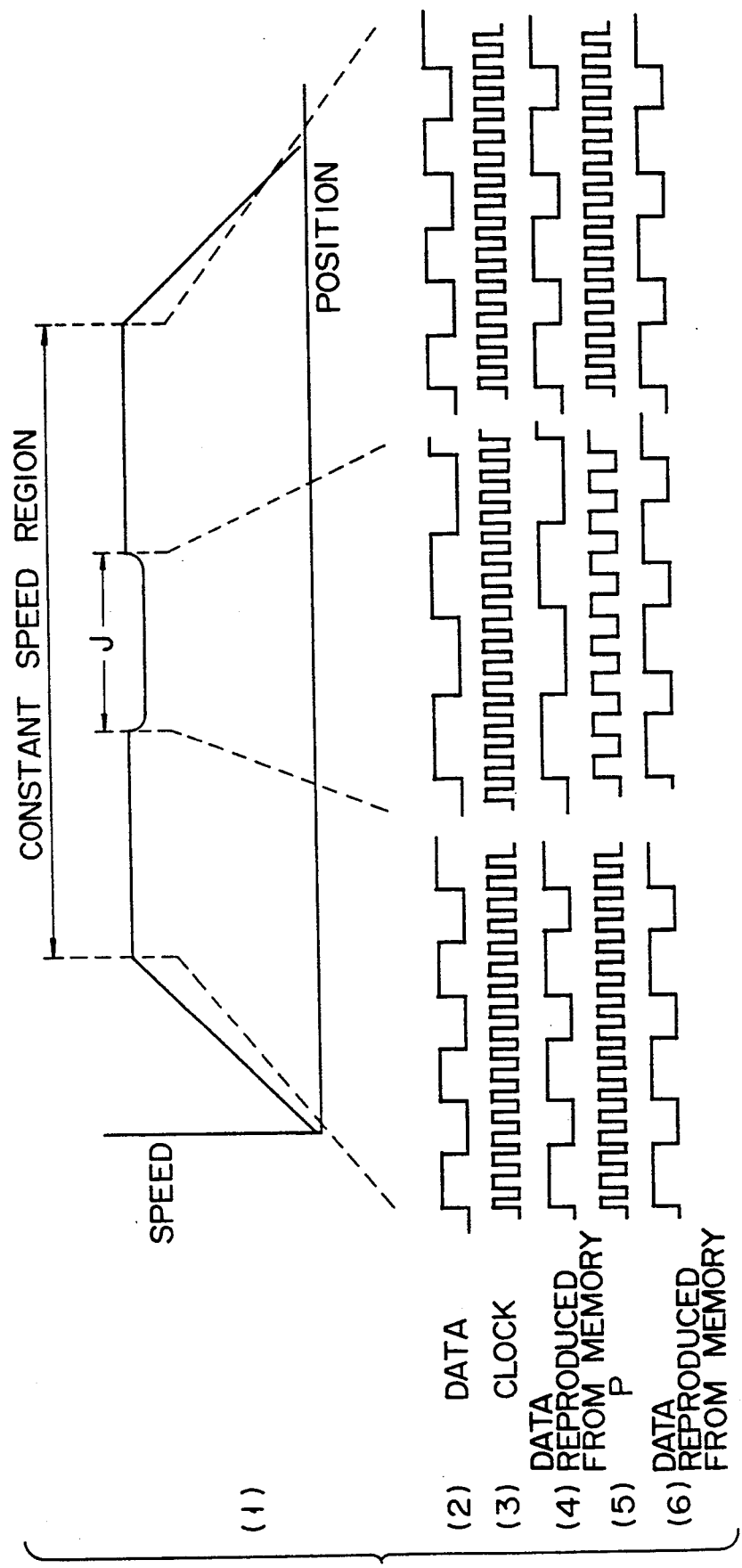
FIG. 3 is a diagram for explaining the effects of the embodiment in FIG. 1.

In FIG. 3, (1) shows the relationship between the relative speed (the ordinate) and the relative position (the abscissa) for the optical card and head in an information reproducing apparatus, which uses an optical card as the recording medium 101 and provides a relative forward and backward movement of the optical card and head 102 in the direction of track. When the speed becomes slow in the constant speed region for readout as indicated by the symbol J, the read data for this portion has a lower frequency than the remaining constant speed portion as shown in (2). Thus, when the read data is stored in the memory based on the clock of a specified period from the clock module, the reading of the stored data with the same clock reproduces almost the same data as the read data as shown in (4), containing the jitter component.

Contrarily, like the aforementioned embodiment, when the read data is stored using the relative position detecting signal P that represents the relative position between the optical card and head as shown in (5), jitters will be contained in both the data to be stored and the relative position detecting signal P, resulting in the jitters being canceled at the memory. Therefore, when the data thus stored in the memory is read in response to the clock of a specified period from the clock module as shown in (3), the data free from jitters will be obtained over the entire portion even with irregular rotation as shown in (6), assuring an accurate reproduction of the recorded data.

The present invention is not limited to the embodiments described above and may be practiced or embodied in still other ways without departing from the spirit or essential character thereof. For instance, while in the above embodiment, the output of the rotary encoder 46 is supplied to the pulse generating circuit 47 to obtain a relative position detecting signal P, the pulse generating circuit 47 may be omitted if the frequency of the signal from the rotary encoder 46 is suitable for the data write at the memory section 44. The relative position detecting signal P may be obtained, without the rotary encoder, by reading the marks on the recording medium which are previously recorded on the medium to indicate positions. The signal P may also be obtained by using a linear scale when the recording medium makes a linear motion as does an optical card. Additionally, when the signal from the encoder contains phase information, for instance, when the signal is a sine wave of a 90° phase shift, pulses generated based on the position information obtained by phase division may be used as the relative position detecting signal P. While in the forgoing embodiment, multiple tracks are scanned simultaneously for data reading, a plurality of sectors on a single track may be scanned simultaneously. Furthermore, the present invention may be applied effectively to scanning one track or one sector to read the data store in it. While an optical card is used as the recording medium in the embodiment, the other recording medium such as an optical disk, optical magnetic disk, or magnetic disk may be used effectively.

Accordingly, in the present invention, since the writing of the data read by the read head into the memory means is controlled on the basis of the relative position between the recording medium and the read head, in synchronization with the clock of a specified period, the jitter component will be removed from the data, which assures an accurate reproduction of the data recorded on the recording medium.

Additional embodiment of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An information reproducing apparatus for reproducing data in which jitter resulting from differences in relative movement between a read head and a recording medium driven by a drive means is eliminated, as data is read by said read head simultaneously from at least two of a plurality of recording areas of said recording medium, said recording areas having data recorded therein, the apparatus comprising:

memory means for storing data read by said read head from at least one of said two recording areas, said memory means including a memory address;

relative position detecting means included in said drive means for detecting a relative position between said recording medium and said read head;

control means for controlling a storing operation of the data into said memory means, based upon an output signal output by said relative position detecting means, said control means controlling said memory address and a writing operation for writing said data read by said read head in said memory means based on said output signal output by said relative position detecting means as said drive means drives said recording medium to thereby eliminate jitter from the data being stored in said memory; and read-out means for reading out data stored in said memory means sequentially and in synchronism with clock signals from a clock signal source having a specified period, and for demodulating the data read out by said read-out means without adding jitter.

2. An information reproducing apparatus according to claim 1, wherein said recording medium includes an optical card having a plurality of recording tracks, and wherein said read head comprises an optical head that directs at least two reading light beams onto said optical card.

3. An information reproducing apparatus according to claim 1, wherein said relative position detecting means includes encoder means having a driving means for driving said recording medium and said read head to move relative to each other.

4. An information reproducing apparatus according to claim 3, wherein said relative position detecting means further includes pulse generating means for generating pulses based on an output signal from said encoder means, said output signal from said encoder means including frequency information.

5. A method for reproducing data in which jitter resulting from undesired differences in relative movement between a read head and a recording medium driven by a drive means is eliminated, as data is read by said read head simultaneously from at least two of a plurality of recording areas of said recording medium, the method comprising the steps of:

storing data in a memory from at least one of said two areas of said recording medium, said data being read by said read head, and said memory including a memory address;

detecting in said drive means a relative position between said recording medium and said read head;

controlling said storing of data in said memory, based on the detected relative position between said recording medium and said read head, said controlling step controlling said memory address and a writing operation to write said data read by said read head in said memory based on the detected relative position between said recording medium and said read head, as said drive means drives said recording medium, for eliminating jitter in the data being stored in said memory; and then reading out stored, jitter free, data from said memory, sequentially and in synchronism with clock signals from a clock source, said clock signals having a specified period, for demodulating said read out jitter free stored data, to thereby provide a jitter free output data signal.

6. The method according to claim 5, wherein the recording medium includes an optical card, and wherein the method further comprises:
directing at least two reading light beams, provided in said read head, onto said optical card for reading data out from at least two areas on said optical card.

7. The method according to claim 5, wherein the detecting step includes driving said recording medium and said read head relative to each other.

8. The method according to claim 7, wherein the detecting step includes generating pulses based on an encoder output signal provided from an encoder means, said encoder output signal having frequency information therein.

9. A data reproducing apparatus wherein data written in a plurality of tracks of a recording medium is read simultaneously by a reading head by moving said recording medium and said reading head relative to each other with a drive means, said data reproducing apparatus comprising:
memory means for storing data read from at least one of said plurality of tracks of said recording medium, by said reading head, said memory means including a memory address;
relative position detecting means included in said drive means for detecting a relative position between said recording medium and said reading head;
means for generating a write pulse signal that is useable for storing data read by said reading head in said memory means, based on a change in a relative position detection signal provided by said relative position detecting means, said write pulse controlling said memory address and a writing operation for writing said data read by said reading head in said memory means based on said relative position detection signal provided by said relative position detecting means as said drive means drives said recording medium, in synchronism with said write pulse signal; and
reading means for reading said data stored in said memory means in synchronism with a read pulse signal generated by a pulse signal source, said read pulse signal having a plurality of given continuous periods.

10. A data reproducing apparatus wherein data written in a plurality of tracks of a recording medium is read simultaneously by a reading head by moving said recording medium and said reading head relative to each other with a drive means, said data reproducing apparatus comprising:
memory means for storing data that is read from at least one of said plurality of tracks of said recording medium, by said reading head, said memory means including a memory address;
first pulse generating means for generating a first pulse that is useable for storing said data read by said reading head, based on a change in a relative position between said reading head and said recording medium, said first pulse controlling said memory address and a writing operation, for writing said data read by said reading head in said memory means based on a relative position output signal output by said drive means as said drive means drives said recording medium;
second pulse generating means for generating a second pulse having a plurality of given continuous periods, said second pulse being usable for reading said data stored in said memory means;
demodulating means for demodulating data read out from said memory means; and
control means for controlling a selection of one of the first and second pulses, said control means selecting said first pulse generated by said first pulse generating means when data is written in said memory means, said control means selecting said second pulse generated by the second pulse generating means when data is read out from said memory means.

11. A data reproducing apparatus wherein data written in a plurality of tracks of a recording medium is read simultaneously by a reading head by moving said recording medium and said reading head relative to each other with a drive means, said data reproducing apparatus comprising:
memory means for storing data read from at least one of said plurality of tracks of said recording medium, by said reading head, said memory means including a memory address;
relative position detecting means for detecting a relative position between said recording medium and said reading head;
means for generating a variable frequency write pulse signal that is useable for storing data read by said reading head in said memory means, a frequency of said variable frequency write pulse signal varying in accordance with a change in a relative position detection signal provided by said relative position detecting means, said variable frequency write pulse controlling said memory address and a writing operation for writing said data read by said reading head in said memory means based on said relative position detection signal that is generated on said drive means drives said recording medium, in synchronism with said write pulse signal; and
reading means for reading said data stored in said memory means in synchronism with a read pulse signal generated by a pulse signal source, said read pulse signal having a plurality of given continuous periods.

12. A data reproducing apparatus wherein data written in a plurality of tracks of a recording medium is read simultaneously by a reading head by moving said recording medium and said reading head relative to each other with a drive means, said data reproducing apparatus comprising:
memory means for storing data that is read from at least one of said plurality of tracks of said recording medium, by said reading head, said memory means including a memory address;
first pulse generating means for generating a variable frequency first pulse that is useable for storing said data read by said reading head, based on a change in a relative position between said reading head and said recording medium, said variable frequency first pulse varying in frequency in accordance with said change in relative position between said reading head and said recording medium, said first pulse controlling said memory address and a writing operation, for writing said data read by said reading head in said memory means based on a relative position output signal output by said drive means as said drive means drives said recording medium;

second pulse generating means for generating a second pulse having a plurality of given continuous periods, said second pulse being usable for reading said data stored in said memory means;

demodulating means for demodulating data read out from said memory means; and control means for controlling a selection of one of the first and second pulses, said control means selecting said first variable frequency first pulse generated by said first pulse generating means when data is written in said memory means, said control means selecting said second pulse generated by the second pulse generating means when data is read out from said memory means.

* * * * *